United States Patent Office 3,740,421
Patented June 19, 1973

3,740,421
POLYOXYETHYLENE-POLYOXYPROPYLENE AQUEOUS GELS
Irving R. Schmolka, Grosse Ile, Mich., assignor to BASF Wyandotte Corporation, Wyandotte, Mich.
No Drawing. Filed Sept. 19, 1966, Ser. No. 580,204
Int. Cl. A61k 7/00, 27/00
U.S. Cl. 424—65    12 Claims

ABSTRACT OF THE DISCLOSURE

Clear aqueous gels are prepared from certain polyoxyethylene polyoxypropylene block polymers. The gels are particularly useful in the formulation of topically-applicable cosmetic and pharmaceutical compositions.

---

This invention relates to a series of novel organic gels and the preparation thereof. In another aspect, the invention relates to compositions containing the novel gels and pharmaceutical and cosmetic ingredients.

The prior art teaches that in order to form gels in formulations containing polyoxyethylene-polyoxypropylene block polymers, it is necessary to include a gelling agent. For example, U.S. Pat. 2,773,801 teaches the use of natural and synthetic gums and gum-like materials as gelling agents. British Patent 786,346 teaches that it is necessary to treat a hydroxyl polymer with a complex condensation product of one mole of a compound of the formula Ti(OR)$_4$, wherein R is an alkyl radical of 1 to 8 carbon atoms with ½ to 4 moles of a saturated C$_2$-C$_6$, aliphatic hydroxy mono-, di-, or tri-carboxylic acid to obtain gellation. It has also been reported by W. Schönfeldt ("Surface Active Addition Products of Ethylene Oxide") that nonyl phenol with 40 or more moles of ethylene oxide added thereto do not form gels in an aqueous solution.

It is an object of this invention to provide a transparent ringing organic polymer gel. Another object is to provide an improved gel for use in cosmetic and pharmaceutical formulations. A still further object of this invention is to provide a gel that does not become liquid at elevated temperatures. Yet another object of this invention is to prepare an organic gel from ingredients that do not require heating to bring about the formation of the gel. These and other objects of the invention will be apparent from the following disclosure.

It has been discovered that within specific limits aqueous solutions of oxyethylated-polyoxypropylene glycols will form gels. Thus, the gels of this invention comprise from about 20 to 90 weight percent of a polyoxyethylated-polyoxypropylene glycol wherein, for the purposes of this invention, the polyoxypropylene glycol hydrophobe has a molecular weight greater than 2,250 and to which has been added from about 16 to 360 moles of ethylene oxide. The balance of the composition is water. The polyoxyethylene-polyoxypropylene block polymer can be represented by the following formula:

(I) 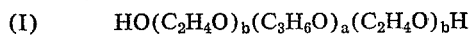

wherein $a$ is an integer such that the hydrophobe base represented by (C$_3$H$_6$O) has a molecular weight of at least 2,250 and $b$ is an integer from about 8 to 180 or higher. When the hydrophobe has a molecular weight of 2,250, the gel contains at least 40% by weight of the block polymer and $b$ in Formula I is at least 26. When the hydrophobe has a molecular weight of 4,000, the gel contains at least 20% by weight of the block polymer and $b$ in Formula I is at least 136.

As used herein, the term "gel" is defined as a solid or semisolid colloid containing considerable quantities of liquid. The particles in a gel are linked in a coherent mesh-work which immobilizes the liquid. A colloidal solution with water as the dispersion medium is called, more specifically, a "hydrosol." The gels within the scope of the present invention are more specifically "ringing" gels that and may be described as gels have a firm jelly-like consistency; that is, by tapping the gel lightly it will vibrate and return to its original configuration.

The gels of the instant invention have many potential uses in cosmetic and pharmaceutical applications. These ringing gels are compatible with most of the known ingredients used in cosmetic and pharmaceutical formulations. For example, the gels of this invention may be compounded with deodorants and antiperspirants. Simple deodorants based on oxyquinoline salts, zinc oxide, etc.; astringents such as aluminum chlorohydrate; and antiseptics such as hexachlorodihydroxydiphenylmethane may be compounded with the aqueous gels of this invention. To those skilled in the cosmetic and pharmaceutical sciences, it will become apparent that these gels may be used in shampoos, in lanolin and oxyethylated lanolin rich skin creams, and with mineral oil for skin and hair products. Examples shown hereinafter will illustrate typical pharmaceutical and cosmetic formulations.

It is an advantage that the gels can be made without the necessity of heating the ingredients. It is another advantage that these ringing gels do not liquify under the eleveated temperatures often encountered during the handling and storage of the finished product. The final product does not deteriorate as a result of the elevated temperatures often encountered in storage. Thus, special handling and storage precautions are not necessary, as is often the case with some of the prior art gel cosmetic and pharmaceutical preparations.

When the gels of this invention are formulated with pharmaceutical or cosmetic ingredients, they may be transparent or opaque. If the active ingredients are water-soluble, the formulation results in a transparent gel. With water-dispersible ingredients, such as mineral oils, lanolin, and lanolin derivatives, the formulated product is opaque. It is also apparent to those skilled in the art that perfumes, preservatives, and color additives may be included in the formulated product.

The hydrophobe base of the polyoxyethylene-polyoxypropylene block polymers of Formula I above is prepared by adding propylene oxide to the two hydroxyl groups of a propylene glycol nucleus. The hydrophobe base can be made to any controlled size. By adding ethylene oxide to the hydrophobe base, it is possible to put polyethylene oxide hydrophilic groups on both ends of the molecule. These hydrophilic ethylene oxide groups may be controlled to constitute anywhere from 10 to 90% of the final molecule. A more detailed explanation of the preparation of these block polymer may be found in U.S. Pat. 2,674,619.

Not all of the block polymers of the formula (I) 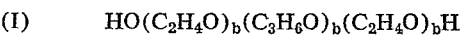

can be used.

Because of the nature of aqueous solutions of this block polymer, three variables effect the formation of the gels. Therefore, it is necessary to recognize certain minimums for the three variables. These variables are:

(1) weight percent concentration of block polymer in the gel,
(2) the molecular weight of the hydrophobic base (C$_3$H$_6$O), and
(3) the number of moles of ethylene oxide condensed on the hydrophobic base.

These minimums define a minimum weight percent concentration of the block polymer with a specific molecular weight polyoxypropylene hydrophobic base having a minimum number of moles of ethylene oxide condensed thereto necessary to form the ringing gels. Thus, at the minimum concentration with a specific molecular weight hydrophobic base, a minimum number of moles of ethylene oxide are required before the specific block polymer will form a gel in an aqueous solution.

The minimum weight percent concentrations with specific molecular weight hydrophobic base are set out in Table I.

TABLE I

| M.W. of hydrophobic base | Min. weight percent concentration to form a gel | Min. number of moles of ethylene oxide required | Total M.W. of block polymer |
|---|---|---|---|
| 2,250 | 40 | 52 | 4,600 |
| 2,750 | 40 | 48 | 4,910 |
| 2,750 | 30 | 84 | 6,450 |
| 3,250 | 30 | 36 | 4,910 |
| 4,000 | 50 | 16 | 4,710 |
| 4,000 | 30 | 48 | 6,150 |
| 4,000 | 20 | 272 | 16,000 |

In interpreting Table I, it is apparent that at least a 40% weight concentration of the block polymer having a hydrophobic base of at least 2,250 molecular weight with at least about 52.0 moles of ethylene oxide condensed thereto will be necessary to form a ringing gel in an aqueous solution. In all cases, the block polymers above the minimums indicated in Table I will form gels in aqueous solutions up to 90 weight percent concentration and higher. Above 90 weight percent concentration, however, the gels tend to become indistinguishable from the starting block polymer itself. Therefore, the weight concentration is a preferred maximum at 90 weight percent. Thus, $a$ (in the above Formula I) is an integer such that the hydrophobic base has a molecular weight of at least 2,250 and $b$ is an integer from about 8 to 180 or higher. It is to be understood that the molecular weight of hydrophobic base may be other than those illustrated in Table I. Thus, for example, if a hydrophobic base of about 2,500 molecular weight is used, it is recognized that a gel may be formed from the block polymer at a concentration of 40 weight percent in an aqueous solution where about 50 moles of ethylene oxide are present in the block polymer.

The technical explanation for the formation of these gels is not entirely understood, and the explanation hereinafter is not to be considered as being limitative of the invention. However, the behavior of these block polymers in forming the gels is believed to be explained on the basis of hydrate formation. It may be speculated that the hydrophobe, because it is different from the hydrophobe of other types of non-ionics, may, in its own right, immobilize the water independently of the oxyethylene chain by hydrogen bonding. It is noteworthy that gel formation occurs at about 70 to 80° F., even where the block polymer contains more than 200 moles of ethylene oxide or over 100 moles per block. It is also believed that the nature of the block polymer adds to this phenomena. It should be noted that the block polymer used in the gels of this invention exhibits a hydrophobe lying between two equal hydrophiles, whereas non-ionics commonly encountered, such as the oxyethylated fatty alcohols and alkyl phenols, have only one hydrophilic chain. This difference in structure suggests that a loose micellar structure is obtained with this class of nonionics and that gel formation would more readily involve entrapment of free water in addition to water due to hydrogen bonding.

The products of this invention are prepared in the manner described below. A gel is conveniently prepared by dissolving from about 20 to 90% by weight of the block polymer, depending upon the molecular weight of the particular hydrophobe base used and the ethylene oxide content in from about 80 to 10% of cold water. The water should be at a temperature below at least 50° F. and preferably between 35 and 45° F. The block polymer is mixed well until it is all dissolved in the water. The solution is then allowed to warm up to room temperature, whereby a clear ringing gel is formed. As the temperature of the solution rises, it is believed that the hydrophile is partially dehydrated and micellar aggregation increases. It is surmised that formation of larger aggregates by the higher molecular weight hydrophobes entrap additional water as compared to the lower weight hydrophobes, this leading in turn to gel formation as the temperature increases. It appears that micellar aggregation occurs with the higher molecular weight hydrophobes as the temperature increases, to cause gel formation. It is theorized that free water is entrapped in the micelles. It also appears that the polyoxypropylene hydrophobe, as well as the polyoxyethylene hydrophile, tie up some of the water by hydrogen bonding.

A better understanding of the invention can be obtained by considering the following examples, which are not to be considered as limiting the invention.

EXAMPLE 1

A polyoxyethylene-polyoxypropylene block polymer of Formula I above, having a polyoxypropylene glycol hydrophobe base of 3,250 molecular weight and about 280 moles of ethylene oxide, was used in making the gel of this example. Total molecular weight of the block polymer is about 15,500. For purposes of identification, this block polymer has a code designation of K.

Thirty grams of block polymer K was gradually added, with continuous stirring, to 70 grams of water. The temperature of the water was between 40 to 50° F. The block polymer K and water were stirred gently until all of the block polymer was dissolved. The solution was then allowed to warm up to room temperature. A clear ringing gel was formed. The ratio of moles of water to moles of ethylene oxide ($H_2O/EO$) is approximately 7:1.

The procedure for making the gels of Examples 2 to 62 in the table below was essentially the same as illustrated in Example 1.

TABLE II

| Example number | Code designation | Weight percent of block polymer in gel | M.W. of hydrophobic base (average) | Moles of ethylene oxide (average) | Approx. total M.W. of block polymer | Mole ratio of $H_2O/E.O.$ in gel |
|---|---|---|---|---|---|---|
| 2 | A | 40 | 2,250 | 53.5 | 4,600 | 7.2 |
| 3 | A | 50 | 2,250 | 53.5 | 4,600 | 4.8 |
| 4 | A | 60 | 2,250 | 53.5 | 4,600 | 3.2 |
| 5 | A | 70 | 2,250 | 53.5 | 4,600 | 2.1 |
| 6 | A | 80 | 2,250 | 53.5 | 4,600 | 1.2 |
| 7 | B | 40 | 2,250 | 119.2 | 7,500 | 5.2 |
| 8 | B | 50 | 2,250 | 119.2 | 7,500 | 3.5 |
| 9 | B | 60 | 2,250 | 119.2 | 7,500 | 2.3 |
| 10 | B | 70 | 2,250 | 119.2 | 7,500 | 1.8 |
| 11 | B | 80 | 2,250 | 119.2 | 7,500 | 0.9 |
| 12 | B | 90 | 2,250 | 119.2 | 7,500 | 0.4 |
| 13 | C | 40 | 2,250 | 193.2 | 10,750 | 4.6 |
| 14 | C | 50 | 2,250 | 193.2 | 10,750 | 3.1 |
| 15 | C | 60 | 2,250 | 193.2 | 10,750 | 2.1 |
| 16 | C | 70 | 2,250 | 193.2 | 10,750 | 1.3 |
| 17 | C | 80 | 2,250 | 193.2 | 10,750 | 0.8 |
| 18 | C | 90 | 2,250 | 193.2 | 10,750 | 0.3 |
| 19 | D | 40 | 2,750 | 49.1 | 4,910 | 8.3 |

TABLE II—Continued

| Example number | Code designation | Weight percent of block polymer in gel | M.W. of hydrophobic base (average) | Moles of ethylene oxide (average) | Approx. total M.W. of block polymer | Mole ratio of H₂O/E.O. in gel |
|---|---|---|---|---|---|---|
| 20 | D | 50 | 2,750 | 49.1 | 4,910 | 5.6 |
| 21 | D | 60 | 2,750 | 49.1 | 4,910 | 3.5 |
| 22 | D | 70 | 2,750 | 49.1 | 4,910 | 2.4 |
| 23 | D | 80 | 2,750 | 49.1 | 4,910 | 1.4 |
| 24 | E | 30 | 2,750 | 84.1 | 6,450 | 10.0 |
| 25 | E | 50 | 2,750 | 84.1 | 6,450 | 4.3 |
| 26 | E | 70 | 2,750 | 84.1 | 6,450 | 1.1 |
| 27 | E | 90 | 2,750 | 84.1 | 6,450 | 0.5 |
| 28 | F | 30 | 2,750 | 244.2 | 13,500 | 7.2 |
| 29 | F | 50 | 2,750 | 244.2 | 13,500 | 3.1 |
| 30 | F | 70 | 2,750 | 244.2 | 13,500 | 1.3 |
| 31 | F | 90 | 2,750 | 244.2 | 13,500 | 0.3 |
| 32 | G | 30 | 3,250 | 37.7 | 4,910 | 16.9 |
| 33 | G | 50 | 3,250 | 37.7 | 4,910 | 7.3 |
| 34 | G | 70 | 3,250 | 37.7 | 4,910 | 3.1 |
| 35 | G | 90 | 3,250 | 37.7 | 4,910 | 0.8 |
| 36 | H | 30 | 3,250 | 63.6 | 6,050 | 12.3 |
| 37 | H | 50 | 3,250 | 63.6 | 6,050 | 5.3 |
| 38 | H | 70 | 3,250 | 63.6 | 6,050 | 2.3 |
| 39 | H | 90 | 3,250 | 63.6 | 6,050 | 0.6 |
| 40 | J | 30 | 3,250 | 75.0 | 6,550 | 11.3 |
| 41 | J | 50 | 3,250 | 75.0 | 6,550 | 4.9 |
| 42 | J | 70 | 3,250 | 75.0 | 6,550 | 2.1 |
| 43 | J | 90 | 3,250 | 75.0 | 6,550 | 0.5 |
| 44 | K | 50 | 3,250 | 279.6 | 15,500 | 3.1 |
| 45 | K | 70 | 3,250 | 279.6 | 15,500 | 1.4 |
| 46 | K | 90 | 3,250 | 279.6 | 15,500 | 0.3 |
| 47 | L | 50 | 4,000 | 16.1 | 4,710 | 16.3 |
| 48 | L | 60 | 4,000 | 16.1 | 4,710 | 10.8 |
| 49 | L | 70 | 4,000 | 16.1 | 4,710 | 7.0 |
| 50 | L | 80 | 4,000 | 16.1 | 4,710 | 4.1 |
| 51 | M | 80 | 4,000 | 30.5 | 5,340 | 2.4 |
| 52 | M | 90 | 4,000 | 30.5 | 5,340 | 1.1 |
| 53 | N | 30 | 4,000 | 48.9 | 6,150 | 16.3 |
| 54 | N | 50 | 4,000 | 48.9 | 6,150 | 7.0 |
| 55 | N | 70 | 4,000 | 48.9 | 6,150 | 3.0 |
| 56 | N | 90 | 4,000 | 48.9 | 6,150 | 0.8 |
| 57 | P | 20 | 4,000 | 273.0 | 16,000 | 13.0 |
| 58 | P | 30 | 4,000 | 273.0 | 16,000 | 7.6 |
| 59 | P | 50 | 4,000 | 273.0 | 16,000 | 3.3 |
| 60 | P | 70 | 4,000 | 273.0 | 16,000 | 1.4 |
| 61 | P | 90 | 4,000 | 273.0 | 16,000 | 0.4 |
| 62 | Q | 20 | 4,000 | 360.5 | 20,000 | 12.2 |
| 63 | Q | 50 | 4,000 | 360.5 | 20,000 | 3.1 |
| 64 | Q | 90 | 4,000 | 360.5 | 20,000 | 0.3 |

EXAMPLE 65

A polyoxyethylene-polyoxypropylene block polymer of Formula I above, having a polyoxypropylene glycol hydrophobe base of 2,250 molecular weight and 53.5 moles of ethylene oxide, was used in attempting to make a gel at 30% concentration in water. This block polymer has a total molecular weight of about 4,600 and is designated as block polymer A.

Thirty grams of block polymer A were place in 70 grams of water at a temperature between 40 and 50° F. The block polymer and water were stirred gently until all the block polymer was dissolved. The solution was poured into a French square, wide-mouth bottle and allowed to warm up to room temperature. The solution was allowed to stand at room temperature overnight. The solution did not form a gel. There was an increase in the viscosity of the solution up to 60 centipoise. The solution could be readily poured out of the bottle.

This example and Example 2 illustrate that it is necessary to have somewhere between 30 and 40% by weight concentration of block polymer A to form a gel with water.

The solutions illustrated in Examples 66 to 76 (Table III below) were made in the same manner as Example 65. Clear solutions having a measurable increase in viscosity were obtained in every case. The solutions could be poured from the sample bottles.

TABLE III

| Example Number | Code designation | Weight percent of block polymer in solution | M.W. of hydrophobic base (average) | Moles of ethylene oxide (average) | Approx. total M.W. of block polymer | Viscosity of solution in centipoise |
|---|---|---|---|---|---|---|
| 66 | B | 30 | 2,250 | 119.2 | 7,500 | 140 |
| 67 | C | 30 | 2,250 | 193.2 | 10,750 | 157 |
| 68 | D | 30 | 2,750 | 49.1 | 4,910 | 90 |
| 69 | E | 20 | 2,750 | 84.1 | 6,450 | 18 |
| 70 | F | 20 | 2,750 | 244.2 | 13,500 | 60 |
| 71 | G | 20 | 3,250 | 37.7 | 4,910 | 16 |
| 72 | H | 20 | 3,250 | 63.6 | 6,050 | 16 |
| 73 | J | 20 | 3,250 | 75.0 | 6,550 | 23 |
| 74 | K | 20 | 3,250 | 279.6 | 15,500 | 96 |
| 75 | P | 10 | 4,000 | 273.0 | 16,000 | 14 |
| 76 | Q | 10 | 4,000 | 360.5 | 20,000 | 17 |

Examples 1 through 64 show that it is possible to make gels containing from 20 to 90% by weight of the block polymer, depending upon the particular block polymer used. As pointed out above, gels containing more than 90% by weight of the block polymer tend to become solid and are difficult to distinguish from the starting block polymer. Examples 65 through 76 illustrate that gels are not formed at the concentrations shown in Table III. There does not appear to be a sharp delineation between the viscous solutions and the gels so that a definite gelation concentration can be defined. However, the gelation occurs somewhere between the concentrations set out in Tables II and III.

Examples 77 through 83 below show practical applications of the ringing gels. The procedure used in making the formulations of Examples 78 through 83 is the same as described below in Example 77.

EXAMPLE 77

A stable transparent antiperspirant gel was made having the following composition:

| | Parts by weight |
|---|---|
| Block Polymer P | 19.5 |
| Chlorohydrol [1] | 38.0 |
| Propylene glycol | 1.0 |
| Urea | 1.0 |
| Hexachlorophene | 0.1 |
| Nitrilotriacetic acid | 0.1 |
| Water | 40.3 |
| | 100.0 |

[1] Chlorohydrol—trade name for a virtually clear, colorless, and odorless 50% solution containing a relatively high concentration of aluminum in the form of ⅚ basic aluminum chloride, $Al_2(OH)_5Cl$.

The polyoxyethylene-polyoxypropylene block polymer P used in this antiperspirant had a polyoxypropylene glycol hydrophobic base of 4,000 molecular weight with about 273 moles of ethylene oxide added thereto and a total molecular weight of about 16,000.

The gel was conveniently prepared by dissolving the block polymer P in cold water (40 to 50° F.) and adding the other ingredients while maintaining that temperature. When the mixture warms up, a gel having a firm jelly-like consistency is formed. The polyoxyethylene-polyoxypropylene block polymer comprised about 32.8% by weight based on the water and the block polymer ingredients.

EXAMPLE 78

A stable transparent antiperspirant gel was made having the following composition:

| | Parts by weight |
|---|---|
| Block polymer P | 18.0 |
| Chlorohydrol [1] | 38.0 |
| Surfactant A or B [2] | 1.0 |
| Perfume oil | 0.4 |
| Water | 42.6 |
| | 100.0 |

[1] See footnote ([1]) in Example 77.
[2] Surfactant A is an oxyethylated $C_{12}$–$C_{13}$ straight-chain alcohol wherein 50% of molecular weight is ethylene oxide. Surfactant B is an isooctyl phenyl polyethoxy ethanol having 9 to 10 ethenoxy units.

Surfactant A or B is used to solubilize the perfume oil. It is to be understood that any surface active material that is capable of solubilizing oil may be used as an equivalent of the Surfactant A or B used in the above formulation.

EXAMPLE 79

A stable dark colored transparent gel useful in treatment of burns or for other topical applications where astringency and stypticity are required was made having the following composition:

| | Parts by weight |
|---|---|
| Block polymer P | 20.0 |
| Tannic acid | 1.0 |
| Water | 79.0 |
| | 100.0 |

EXAMPLE 80

A stable transparent gel for use topically as a bactericide and fungicide was prepared having the following composition:

| | Parts by weight |
|---|---|
| Block polymer P | 23.84 |
| Boric acid | 4.76 |
| Water | 71.40 |
| | 100.00 |

EXAMPLE 81

A soft opaque white gel was made. This gel may be used topically for superficial fungus infections such as athlete's foot.

| | Parts by weight |
|---|---|
| Block polymer F | 27.0 |
| Zinc undecylenate | 5.0 |
| Undecylenic acid | 2.0 |
| Water | 66.0 |
| | 100.0 |

The block polymer F used in this formulation had a polyoxypropylene glycol hydrophobic base of 2,750 molecular weight with about 245 moles of ethylene oxide added thereto and a total molecular weight of about 13,500.

EXAMPLE 82

A soft opaque white gel was made that may be used externally as a mild astringent, antiseptic, and protective in skin diseases.

| | Parts by weight |
|---|---|
| Block polymer K | 25.0 |
| Zinc oxide | 8.6 |
| Water | 66.4 |
| | 100.0 |

Block polymer K has a hydrophobe of 3,250 molecular weight with about 280 moles of ethylene oxide added thereto. Total molecular weight of K was about 15,500.

EXAMPLE 83

A soft opaque white gel was made that may be used as a sachet. The formulation contained:

| | Parts by weight |
|---|---|
| Block polymer N | 25.0 |
| Propylene glycol | 6.0 |
| Lanolin | 2.0 |
| Perfume | 5.0 |
| Mineral oil | 15.0 |
| Water | 47.0 |
| | 100.0 |

Block polymer N, having a total molecular weight of about 6,150, consisted of about 49 moles of ethylene oxide added to a polyoxypropylene glycol base of 4,000 molecular weight.

What is claimed is:

1. A gel composition comprising
   (A) from about 20 to 90 weight percent of a polyoxyethylene-polyoxypropylene block polymer of the formula:

$$HO(C_2H_4O)_b(C_3H_6O)_a(C_2H_4O)_bH$$

wherein $a$ is an integer such that the hydrophobe represented by $(C_3H_6O)$ has an average molecular weight of from 2250 to 4000 and $b$ is an integer of from 16 to 360.5 such that the hydrophile represented by $(C_2H_4O)$ constitutes from about 10 to 90 weight percent of the polymer, and
   (B) from about 80 to 10 weight percent of water, with the provisos that:
      (1) when $a$ is an integer such that the average molecular weight of the hydrophobe is about 2250, then the total moles of ethylene oxide is from about 52 to 193.2, the total average molecular weight of the block polymer is from 4600 to 10,750 and the gel composition comprises from 40 to 90 weight percent of the block polymer;
      (2) when $a$ is an integer such that the average molecular weight of the hydrophobe is about 2750, then the total moles of ethylene oxide is from about 48 to 244.2, the total average molecular weight of the block polymer is about 4910 to 13,500 and the gel composition comprises from 40 to 90 weight percent of the block polymer;
      (3) when $a$ is an integer such that the average molecular weight of the hydrophobe is about 3250, then the total moles of ethylene oxide is from about 36 to 279.6, the total average molecular weight of the block polymer is from about 4910 to 15,500 and the gel composition comprises from 30 to 90 weight percent of the block polymer;
      (4) when $a$ is an integer such that the average molecular weight of the hydrophobe is about 4000, then the total moles of ethylene oxide is from about 48 to 360.5, the total average molecular weight of the block polymer is from 6150 to 20,000 and the gel composition comprises from 30 to 90 weight percent of the block polymer; with the further proviso that when the total moles of ethylene oxide is from about 273 to 360.5, the total average molecular weight of the block polymer is from 16,000 to 20,000 and the gel composition comprises from 20 to 90 weight percent of the block polymer.

2. The composition of claim 1 wherein $a$ is an integer such that the hydrophobe has a molecular weight of about 4000.

3. The composition of claim 1 wherein $a$ is an integer such that the hydrophobe has a molecular weight of about 4000 and $b$ is an integer such that the hydrophile constitutes about 70 weight percent of the polymer.

4. The composition of claim 1 wherein $a$ is an integer such that the hydrophobe has a molecular weight of about 3250.

5. The composition of claim 1 wherein $a$ is an integer such that the hydrophobe has a molecular weight of about 3250 and $b$ is an integer such that the hydrophile constitutes about 80 weight percent of the polymer.

6. The composition of claim 1 wherein the block polymer comprises from about 20 to 50 weight percent and water comprises from about 80 to 50 weight percent of the composition.

7. The gel composition of claim 1 additionally containing an effective amount of a member selected from the group consisting of an astringent, an antiperspirant, an antiseptic, mineral oil, lanolin, and oxyethylated lanolin.

8. A process for the preparation of a gel composition which comprises the steps of
   (A) dissolving, based on 100 parts of said composition, from 20 to 90 parts of a polymer of the formula:

$$HO(C_2H_4O)_b(C_3H_6O)_a(C_2H_4O)_bH$$

wherein $a$ is an integer such that the hydrophobe represented by $(C_3H_6O)$ has a molecular weight of from 2250 to 4000, and $b$ is an integer of from 16 to 360.5 such that the hydrophile represented by $(C_2H_4O)$ constitutes from about 10 to 90 weight percent of the polymer in from 80 to 10 parts of water at a temperature between 35° F. and 50° F., and
   (B) warming the solution resulting from step (A) to about 70° F. to 80° F. whereby a clear gel is formed, with the provisos that:
      (1) when $a$ is an integer such that the average molecular weight of the hydrophobe is about 2250, then the total moles of ethylene oxide is from about 52 to 193.2, the total average molecular weight of the block polymer is from 4600 to 10,750, and the gel composition comprises from 40 to 90 weight percent of the block polymer;
      (2) when $a$ is an integer such that the average molecular weight of the hydrophobe is about 2750, then the total moles of ethylene oxide is from about 48 to 244.2, the total average molecular weight of the block polymer is from 4910 to 13,500 and the gel composition comprises from 40 to 90 weight percent of the block polymer;
      (3) when $a$ is an integer such that the average molecular weight of the hydrophobe is about 3250, then the total moles of ethylene oxide is from about 36 to 279.6, the total average molecular weight of the block polymer is from 4910 to 15,500 and the gel composition comprises from 30 to 90 weight percent of the block polymer;
      (4) when $a$ is an integer such that the average molecular weight of the hydrophobe is about 4000, then the total moles of ethylene oxide is from about 48 to 360.5, the total average molecular weight of the block polymer is from 6150 to 20,000 and the gel composition comprises from 30 to 90 weight percent of the block polymer; with the further proviso that when the total moles of ethylene oxide is from about 273 to 360.5, the total average molecular weight of the block polymer is from 16,000 to 20,000 and the gel composition comprises from 20 to 90 weight percent of the block polymer.

9. The process of claim 8 wherein $a$ is an integer such that the hydrophobe has a molecular weight of about 4000.

10. The process of claim 8 wherein $a$ is an integer such that the hydrophobe has a molecular weight of 4000 and $b$ is an integer such that the hydrophile constitutes about 70 weight percent of the polymer.

11. The process of claim 8 wherein $a$ is an integer such that the hydrophobe has a molecular weight of about 3250.

12. The process of claim 8 wherein $a$ is an integer such that the hydrophobe has a molecular weight of 3250 and $b$ is an integer such that the hydrophile constitutes about 80 weight percent of the polymer.

(References on following page)

References Cited

UNITED STATES PATENTS

| | | | |
|---|---|---|---|
| 2,674,619 | 4/1954 | Lundsted | 260—485 |
| 3,042,631 | 7/1962 | Strandskov | 260—615 UX |
| 3,036,118 | 5/1962 | Jackson et al. | 260—615 X |

FOREIGN PATENTS

| | | | |
|---|---|---|---|
| 784,659 | 10/1957 | Great Britain | 167—63 |

OTHER REFERENCES

Sagarin: Cosmetics Science and Technology, 1957, pp. 726–736.

ALBERT T. MEYERS, Primary Examiner

L. SCHENKMAN, Assistant Examiner

U.S. Cl. X.R.

252—316; 424—70, 78, 342, 345